(12) United States Patent
Hashimoto

(10) Patent No.: US 8,864,019 B2
(45) Date of Patent: Oct. 21, 2014

(54) AUTO CONFIGURABLE TRANSFER AND MANAGEMENT SYSTEM

(71) Applicant: Pink Zulu Labs, Inc., San Francisco, CA (US)

(72) Inventor: Kaz Hashimoto, Jackson, WY (US)

(73) Assignee: Pink Zulu Labs, Inc., San Francisco, CA (US)

( * ) Notice: Subject to any disclaimer, the term of this patent is extended or adjusted under 35 U.S.C. 154(b) by 0 days.

(21) Appl. No.: 13/720,085

(22) Filed: Dec. 19, 2012

(65) Prior Publication Data

US 2013/0161383 A1    Jun. 27, 2013

Related U.S. Application Data

(60) Provisional application No. 61/579,143, filed on Dec. 22, 2011.

(51) Int. Cl.
| | |
|---|---|
| G06F 17/00 | (2006.01) |
| H04N 1/00 | (2006.01) |
| G06F 17/30 | (2006.01) |
| H04W 84/18 | (2009.01) |
| H04W 4/00 | (2009.01) |
| H04L 29/08 | (2006.01) |

(52) U.S. Cl.
CPC .. G06F 17/30265 (2013.01); *H04N 2201/3278* (2013.01); *H04W 84/18* (2013.01); H04N 1/00137 (2013.01); H04N 1/00167 (2013.01); *H04W 4/008* (2013.01); *H04L 67/1095* (2013.01)
USPC .......................................... 235/375; 709/227

(58) Field of Classification Search
USPC ..................................... 709/227–237; 235/375
See application file for complete search history.

(56) References Cited

U.S. PATENT DOCUMENTS

| | | | |
|---|---|---|---|
| 8,046,504 B2 | 10/2011 | Feinberg | |
| 2004/0119831 A1 | 6/2004 | Miyawaki | |
| 2005/0033848 A1 | 2/2005 | Croome | |
| 2005/0052695 A1 | 3/2005 | Fukunaga | |
| 2007/0174243 A1 | 7/2007 | Fritz | |
| 2009/0256780 A1* | 10/2009 | Small et al. ..................... 345/55 |

(Continued)

FOREIGN PATENT DOCUMENTS

| | | |
|---|---|---|
| FR | 2906667 | 4/2008 |
| WO | WO 2008048809 | 4/2008 |
| WO | WO 2011011398 | 1/2011 |

OTHER PUBLICATIONS

O'Brien, "Eye-Fi Direct Mode is here, turns tablets and smartphones into must-have camera accessories," Apr. 20, 2012, available at: http://www.engadget.com/2011/04/20/eye-fi-direct-mode-is-here-turns-tablets-and-smartphones-into-m/.

(Continued)

*Primary Examiner* — Christle I Marshall
(74) *Attorney, Agent, or Firm* — Vierra Magen Marcus LLP

(57) ABSTRACT

The technology described herein is directed to a system that quickly and efficiently transmits photographs from a camera to one or more computing devices. The link for such a transmission is easily and automatically configured. Once the photographs are stored in the one or more computing devices, they can be submitted to a photograph management system that facilitates distribution of the photographs as well as collaboration with other individuals or autonomous agents for editing and re-editing of photographs.

24 Claims, 11 Drawing Sheets

(56) References Cited

U.S. PATENT DOCUMENTS

| | | |
|---|---|---|
| 2010/0161575 A1 | 6/2010 | Basso |
| 2012/0311165 A1* | 12/2012 | Renschler et al. ............ 709/228 |
| 2013/0206832 A1 | 8/2013 | Hashimoto |

OTHER PUBLICATIONS

Stevens, "Eye-Fi Pro wireless SD card hands-on," Jun. 10, 2009, available at http://www.engadget.com/2009/06/10/eye-fi-pro-wireless-sd-card-hands-on/.

Zhang, "Toshiba Takes Aim at Eye-Fi,. Looking to Standardize Wireless Memory Cards," Jun. 22, 2010, available at: http://www.petapixel.com/2010/06/22/toshiba-takes-aim-at-eye-fi-looking-to-standardize-wireless-memory-cards/.

PCT International Search Report dated Apr. 10, 2013, PCT Patent Application No. PCT/US2012/070982.

PCT Written Opinion of the International Searching Authority dated Apr. 10, 2013, PCT Patent Application No. PCT/US2012/070982.

PCT International Search Report Written Opinion of the International Searching Authoritydated May 2, 2013, PCT Patent Application No. PCT/US2013/025772, 11 pages.

* cited by examiner

Figure 7
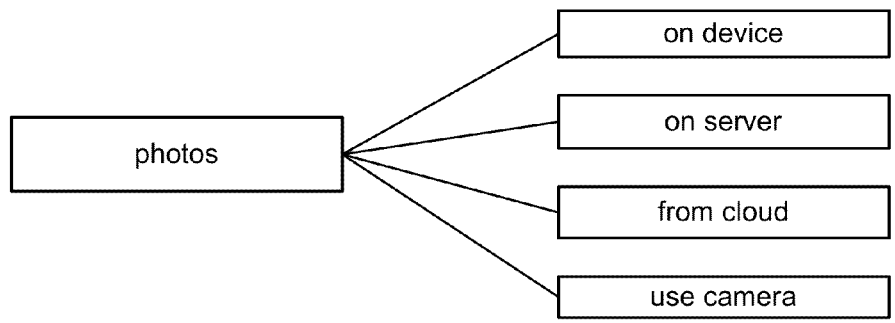
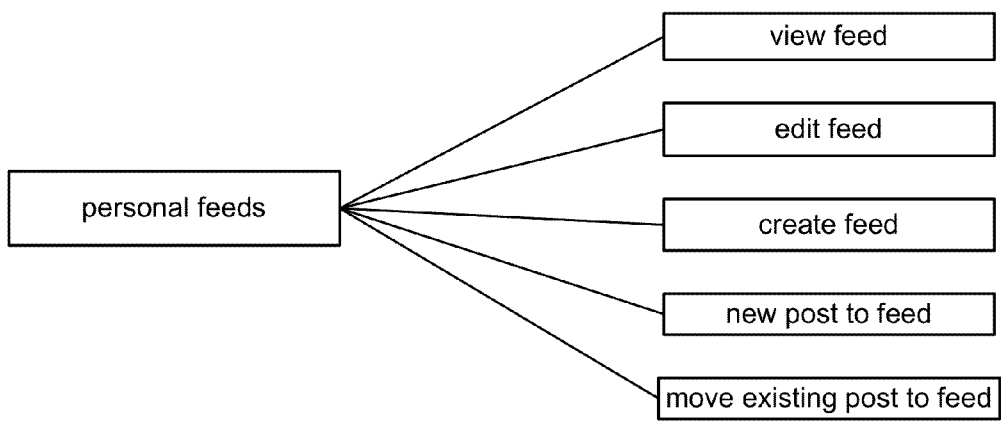
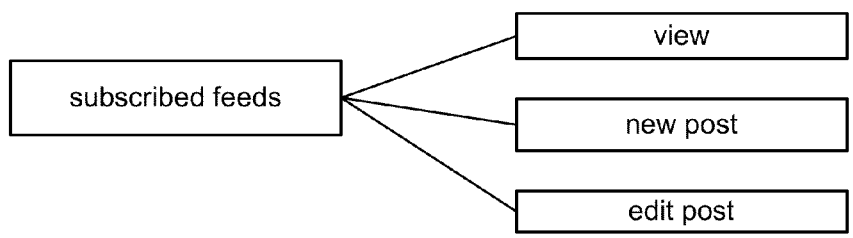

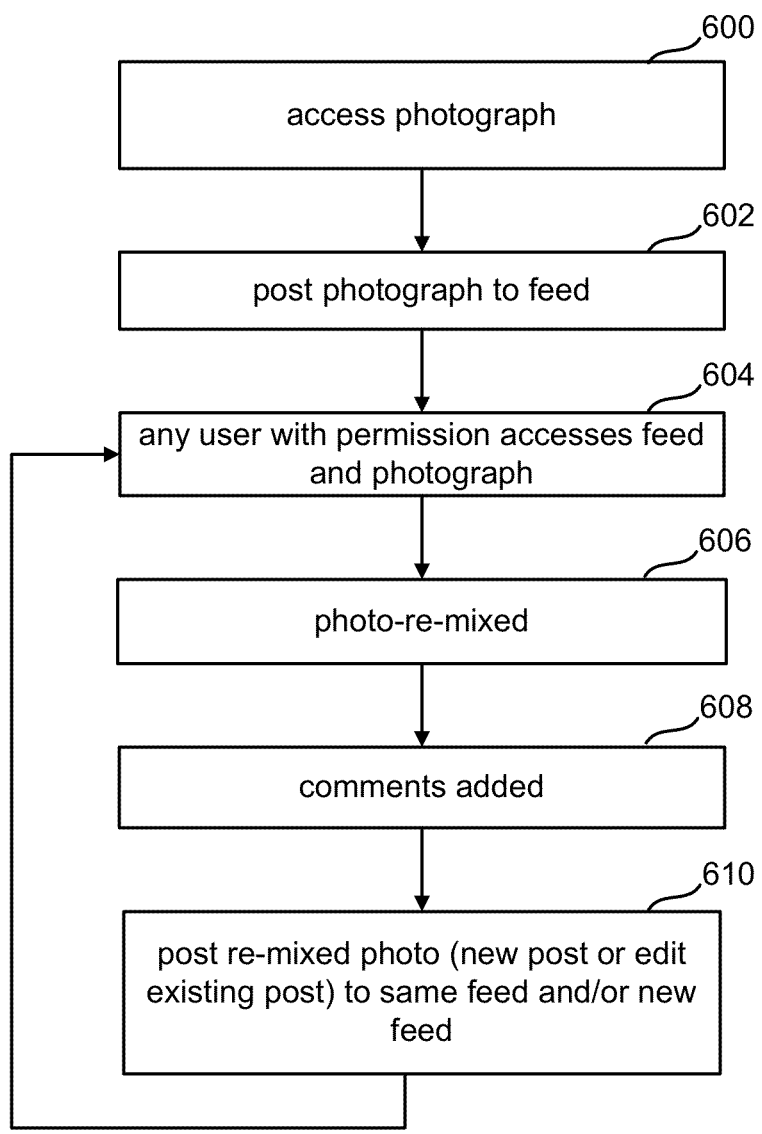

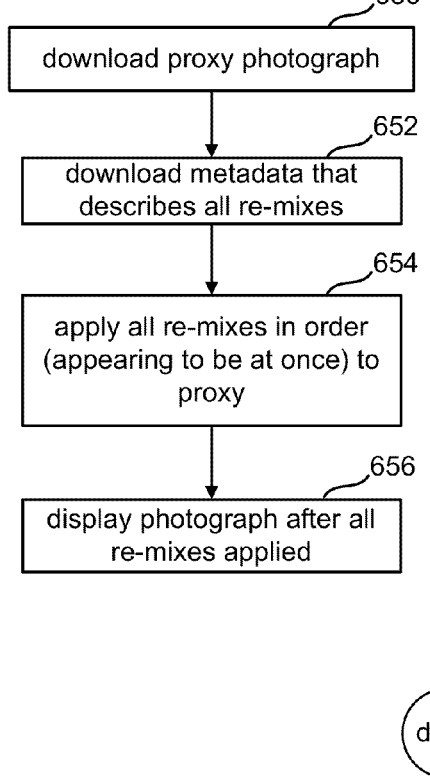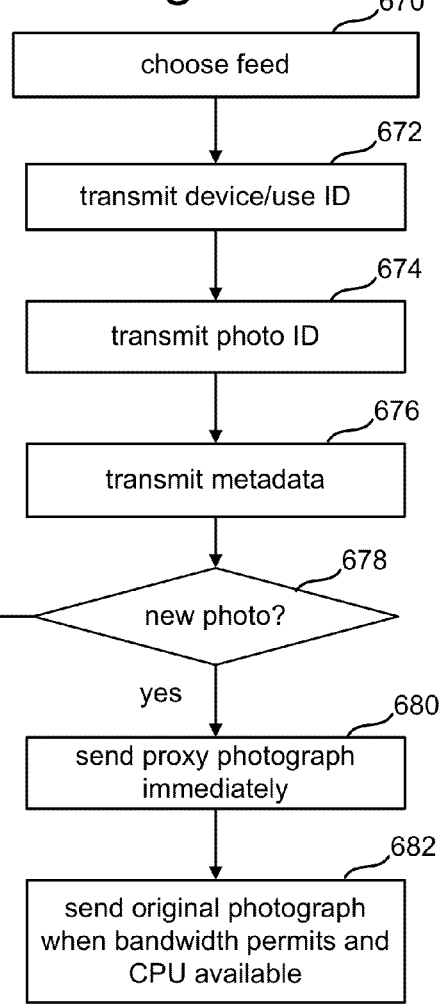

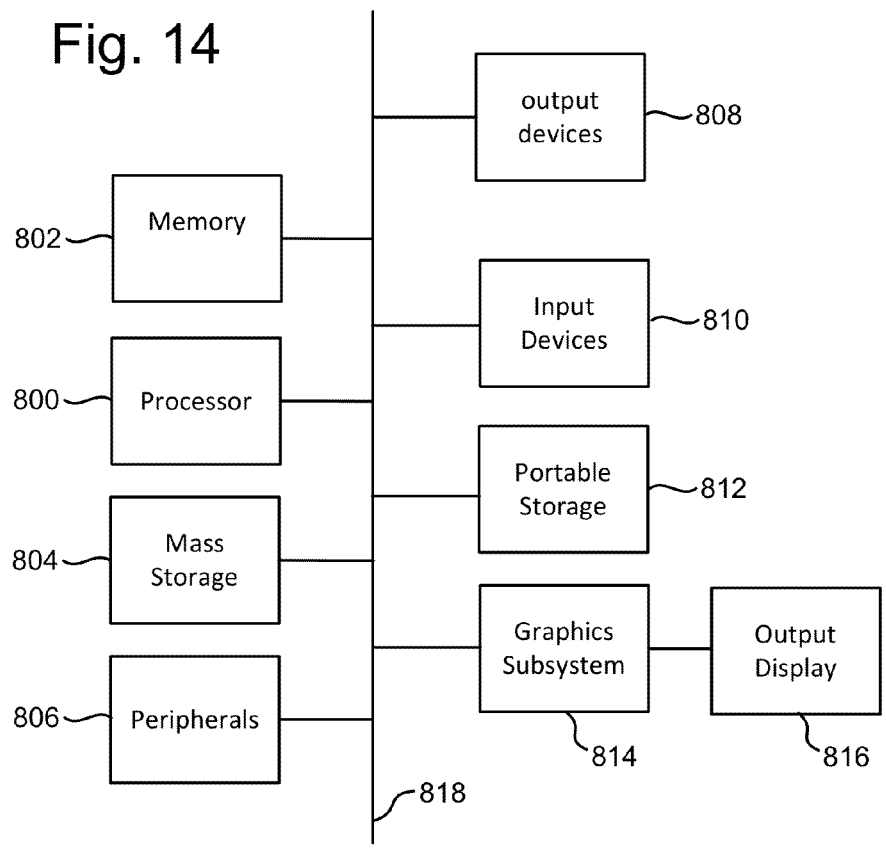

us 8,864,019 B2

AUTO CONFIGURABLE TRANSFER AND MANAGEMENT SYSTEM

This application claims the benefit of U.S. Provisional Application No. 61/579,143, "Auto Configurable Photo Transfer And Management System," filed on Dec. 22, 2011.

BACKGROUND OF THE INVENTION

1. Field of the Invention

The present invention relates to technology for automatically configuring a communication link to transfer and manage content.

2. Description of the Related Art

People enjoy taking photographs on vacation, at special events and at other times. The typical work flow is to take the photographs with a digital camera, store the photographs on a memory card in the camera, transfer the photographs from the memory card to a computer when the event has completed and the user has returned home, edit the photographs using editing software on the digital files, store the digital files on the user's computer, order prints and/or email the photos to others. This is a serial process that is slow, inefficient and not collaborative. For example, the only copies of the photographs remain on user memory card in the camera until the user returns home. On a long vacation, this could result in the user not sharing or managing the photos for a long time.

BRIEF DESCRIPTION OF THE DRAWINGS

FIG. 7 is a block diagram describing the functions of the snap engine.

FIG. 9 is a flow chart describing one embodiment of a process for re-mixing and posting photographs in a collaborative environment.

FIG. 10 is a flow chart describing one embodiment of a process for accessing a photograph from a feed.

FIG. 11 is a flow chart describing one embodiment of a process for posting a photograph to a feed.

FIG. 14 is a block diagram of a computing device.

DETAILED DESCRIPTION

The technology described herein is directed to a system that quickly and efficiently transmits photographs from a camera to one or more computing devices. The link for such a transmission is easily and automatically configured. Once the photographs are stored in the one or more computing devices, they can be submitted to a photograph management system that facilitates distribution and collaboration of the photographs. Much of the discussion below is about photographs; however, the technology described herein can be used with video and other media/content.

Figure 1:
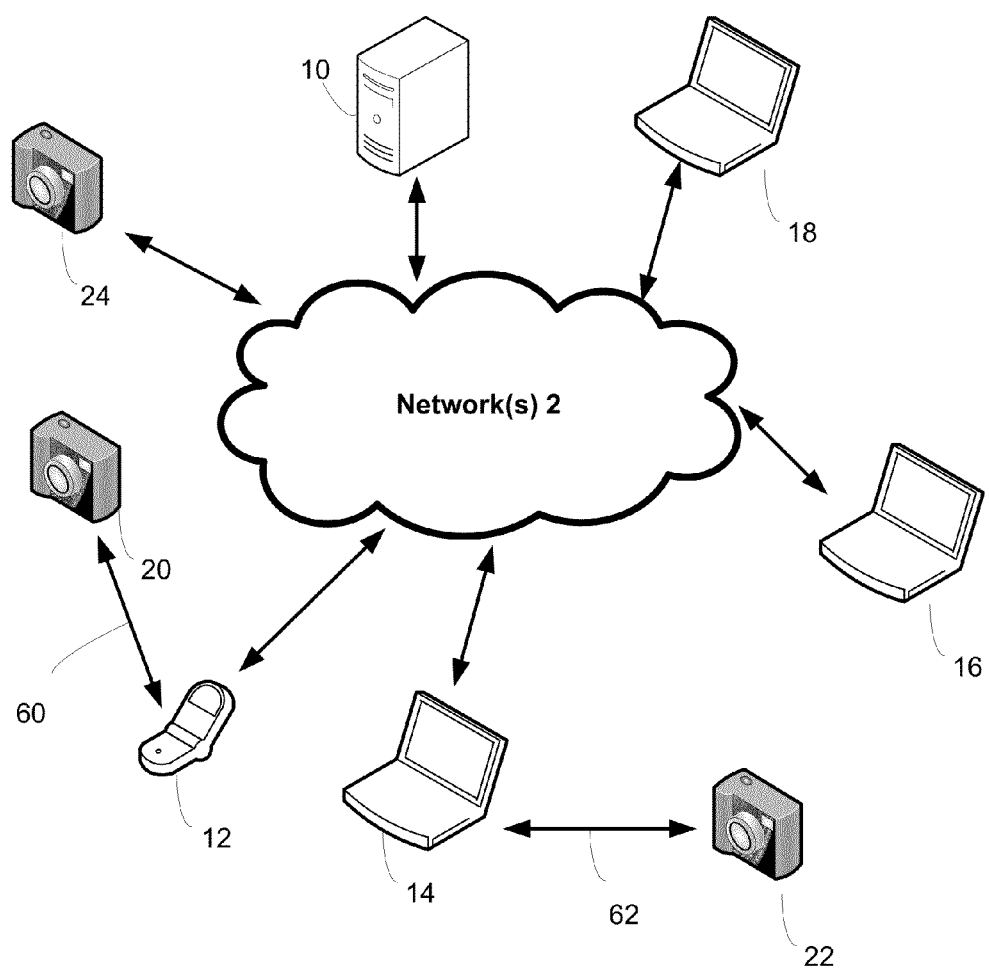
FIG. 1 is a block diagram of one embodiment of a system that can use and manage photographs.

FIG. 1 shows network(s) 2 connected to various computing devices. In one embodiment, network(s) 2 can be the Internet and/or one or more local area networks, wide area networks, wireless networks, etc. FIG. 1 also depicts server 10, which can include one or more computing devices that are load balanced and behind firewalls, etc. Mobile computing device 12 is in communication with server 10 via network(s) 2. Mobile computing device 12 can be a smart cellular telephone, tablet computing device or other mobile computing device. FIG. 1 also shows computers 14, 16 and 18, which can include desktop computers, laptop computers, tablet computers, handheld computing devices, mobile cellular telephones, or other computing devices. In one embodiment, computing devices 12, 14, 16 and 18 can all communicate with server 10 via network(s) 2.

FIG. 1 also shows digital cameras 20, 22 and 24. These digital cameras can represent any make or model of still or video cameras. Digital camera 20 is shown to be in communication (unidirectional communication or bidirectional communication) with mobile computing device 12. Digital camera 22 is shown to be in communication (unidirectional communication or bidirectional communication) with computer 14. Digital camera 24 can be in communication (unidirectional communication or bidirectional communication) with server 10, mobile computing device 12, computer 14, computer 16 or computer 18 via network(s) 2. More details about the hardware structure of the computing devices of FIG. 1 are described below with respect to FIGS. 13 and 14.

In operation, cameras 20, 22 or 24 (as well as cameras on any of the computing devices depicted in FIG. 1) are used to take photographs. These photographs are then provided to a photograph management system that facilitates distribution, storage, editing and collaboration of the photographs. In one embodiment, the photograph management system is provided with central control and storage using server 10. Any of computing devices 12, 14, 16 and 18 can provide photographs to server 10, retrieve photographs from server 10, edit photographs, and send photographs to any of the other computing devices.

To more quickly and efficiently move photographs from cameras 20, 22 and 24 to the photograph management system, technology is described for providing a wireless transmission link from the photograph storage device (which can be the camera itself or also include a memory card in or out of the camera) to any one of computing devices 12, 14, 16 and 18. Additionally, the system can automatically configure that transmission link, as described below. For example, FIG. 1 shows a wireless transmission link 60 between camera 20 and mobile computing device 12, and a wireless transmission link 62 between camera 22 and computing device 14. Additionally, camera 24 can communicate wirelessly via the Internet to any of the computing devices depicted in FIG. 1.

Figure 2:
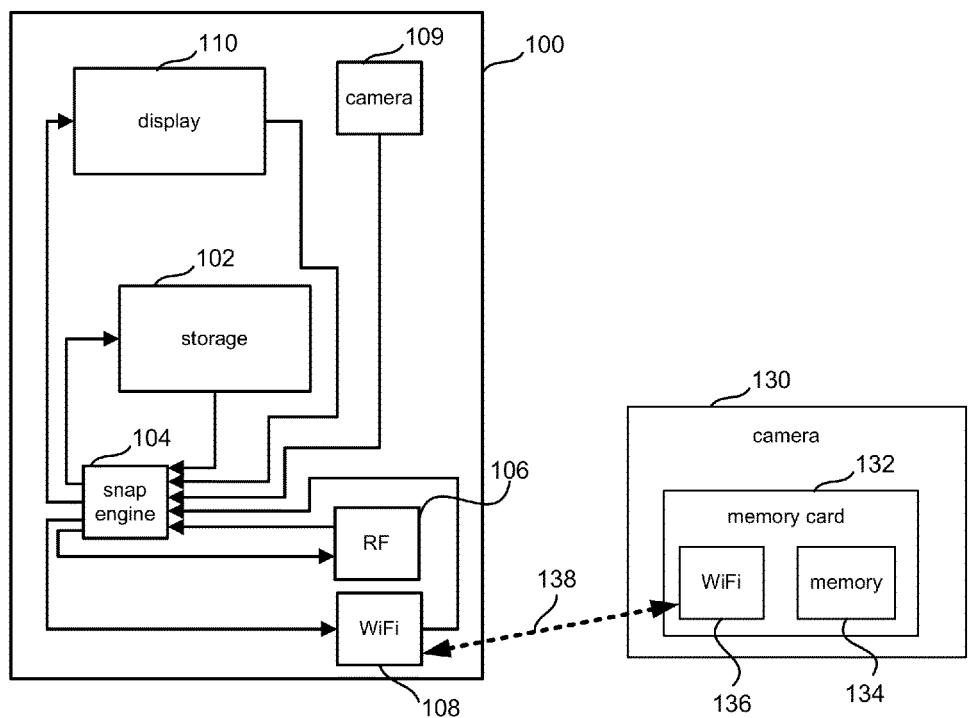
FIG. 2 is a block diagram of computing device and a camera.

FIG. 2 provides a more detailed block diagram of components of a computing device 100 that has a wireless transmission link 138 to camera 130. Computing device 100 of FIG. 2 can be mobile computing device 12, computing device 14, computing device 16 or computing device 18 of FIG. 1. Camera 130 of FIG. 2 can be camera 20, 22 or 24 of FIG. 1.

Computing device 100 of FIG. 2 includes a storage system 102 which can include flash memory, EEPROM, hard disc drive, other nonvolatile memory, RAM, and/or other storages devices. Computing device 100 also includes snap engine 104 which can be implemented in software only, hardware only or a combination of software and hardware. Snap engine 104 performs the methods described below. Any software that implements snap engine 104 will be stored on a processor readable storage device. Computing device 106 also includes an RF transceiver which can receive and transmit RF signals (such as cellular phone signals). A WiFi transceiver 108 is also included which can communicate on a WiFi network. For purposes of this document, WiFi can include Bluetooth and other RF communication.

Computer 100 also includes a camera 109. In one embodiment, camera 109 includes a charge-coupled device (CCD) with one or more lenses to capture images in various formats and resolutions. Computing device 100 also includes a display 110 which can be any display known in the art. In one embodiment, storage 102, RF transceiver 106, WiFi transceiver 108, camera 109 and display 110 can all communicate data to snap engine 104 and receive data from snap engine 104. For example, storage device 102, RF transceiver 106, WiFi transceiver 108, camera 109 can all act as input sources of photographs. Snap engine 104 can act on those photographs (edit the photographs, resample the photographs, change resolution of the photographs, annotate the photographs, add captions, etc.). The output of the actions taken by snap engine 104 can be provided to RF transceiver 106 and WiFi transceiver 108 for eventual transmission to other devices, such as server 10. In one embodiment, computer 100 will also include an Ethernet connection for wire based communication. The output photograph of snap engine 104 can also be provided on the display 110.

Camera 130 includes a memory card 132 for storing photographs taken by camera 130. In one embodiment, memory card 132 includes a memory system 134 and a WiFi transceiver 136. In one embodiment, memory system 134 is a flash memory system; however, other nonvolatile storage technologies can also be used. Memory card 130 can be any standard format known in the art including Compact Flash, SD, Mini-SD, XD, Memory Stick, Memory Stick Pro and other formats.

Figure 3A:
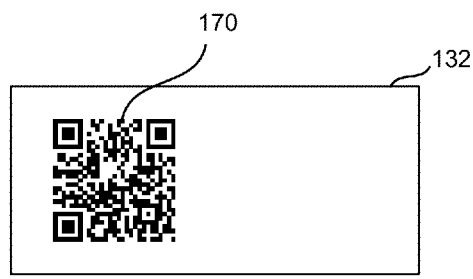
FIGS. 3A and 3B depict memory cards.
Figure 3B:
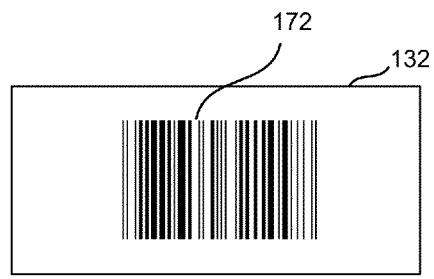

Transmission link 138 will be created, automatically configured, and used to transmit photographs between WiFi transceiver 108 of computing device 100 and WiFi transceiver 136 of memory card 132 so that photographs are transferred from memory system 134 on memory card 130 to computing device 100 for storage 102 and snap engine 104. In one embodiment, wireless link 138 will be automatically configured by computing device 100. In that scenario, computing device 100 will need to know the identification of memory card 132 to perform the auto configuration. In one embodiment, a user will manually type in a unique (or non-unique) ID for memory card 132 into computing device 100. In another embodiment, computing device 100 will automatically sense the ID from a surface of or transmission from memory card 132. For example, FIG. 3A shows the outside surface of memory card 132 including a QR code 170. Computing device 100 can take a photograph of QR code 170 using camera 109. A unique identification (or identification that is not unique) can be embedded within QR code 170. Additionally, QR code 170 can include various configuration parameters including the SSID for a wireless network, password for authenticating in order to get access to the wireless network and a MAC address for WiFi transceiver 136. FIG. 3B shows another embodiment of memory card 132 including a barcode 172. In this embodiment, computing device 100 will take a photograph of barcode 172 using camera 109. The barcode will be decoded to determine the information described above. In other embodiments, the system can read the codes using other types of sensors including IR and RFID sensors, in order to obtain the configuration parameters. Once computing device 100 has the configuration parameters, computing device 100 will automatically configure the WiFi network connection 138 between transceiver 136 and transceiver 108.

Figure 4:
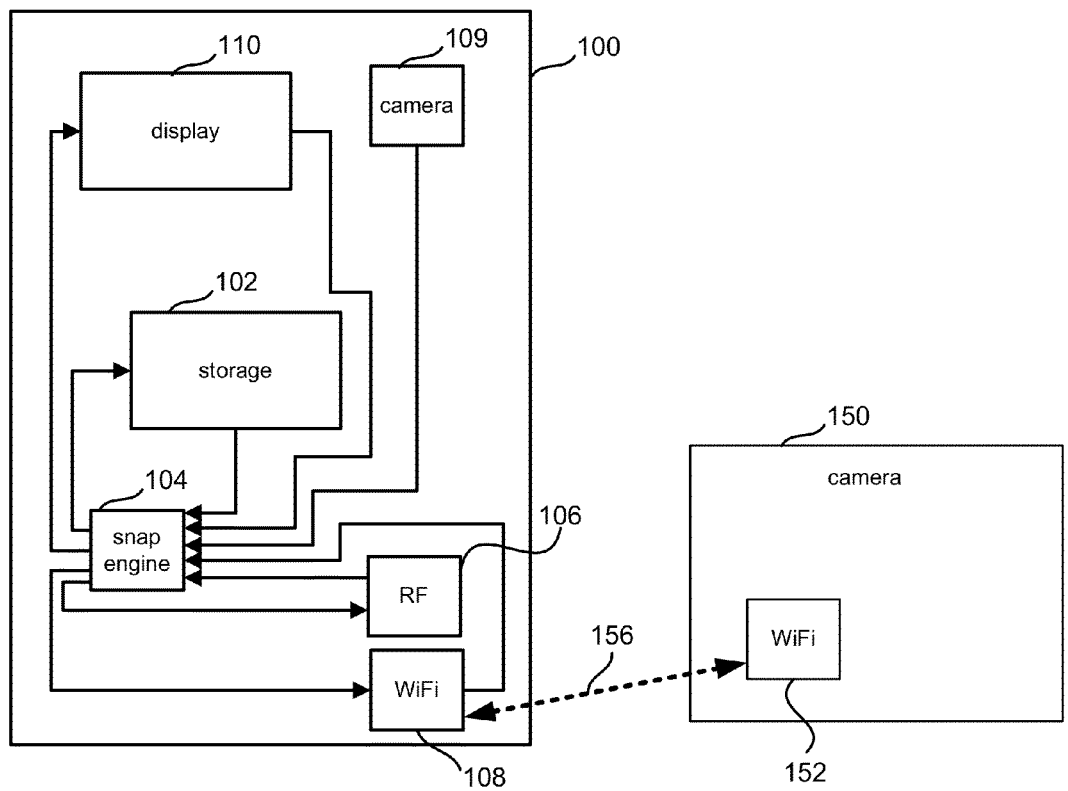
FIG. 4 is a block diagram of computing device and a camera.
Figure 5A:
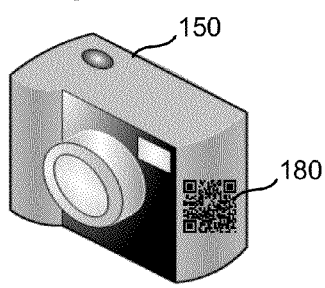
FIGS. 5A and 5B depict memory cameras.
Figure 5B:
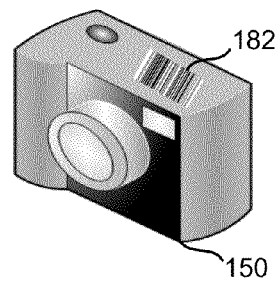

FIG. 4 shows another embodiment which includes camera 150 in communication with computing device 100. In this embodiment, camera 150 has a WiFi transceiver 152 built into camera 150 which will establish a link 156 with WiFi transceiver 108 of computing device 100. Therefore, camera 150 can be used with a standard memory card that does not include WiFi technology or memory embedded in camera 150. The embodiments of FIGS. 2 and 4 both include a WiFi transceiver in a photograph storage device. In the embodiment of FIG. 2, the photograph storage device is the memory card while in the embodiment of FIG. 4 the photograph storage device is the camera. Even if camera 150 stores photographs on a memory card within camera 150, it is still a photograph storage device for purposes of this document. FIG. 5A shows an embodiment where camera 150 includes a QR code 180 on the outside surface of the camera. FIG. 5B shows and embodiment of camera 150 with the barcode 182 on the outside surface of camera 150. As discussed above, computing device 100 will take a photograph of the QR code 180 or barcode 182 and identify the data encoded within those codes.

Figure 6:
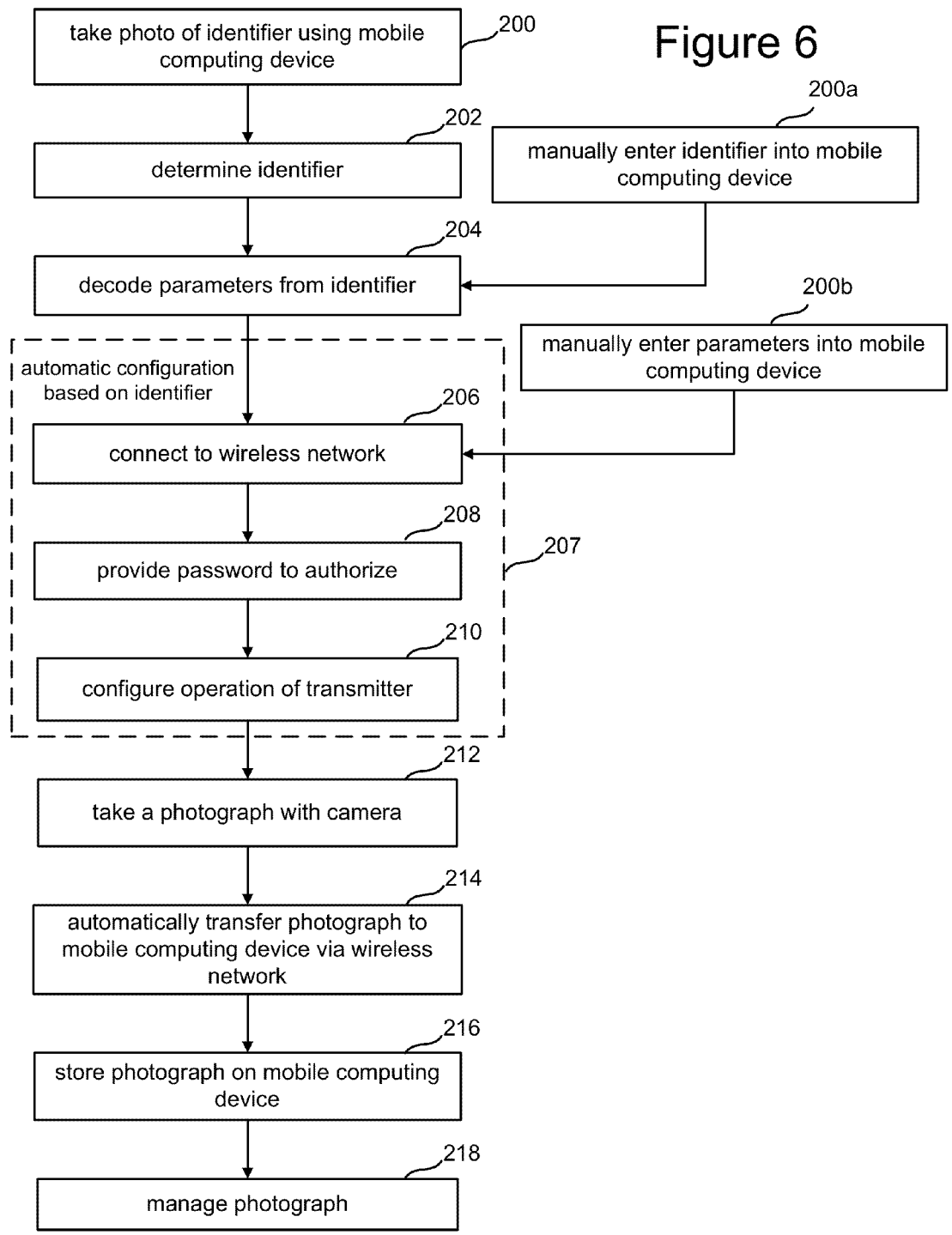
FIG. 6 is a flow chart describing one embodiment of a process for configuring a communications link.

FIG. 6 is a flowchart describing the operation by the snap engine for automatically configuring the transmission links discussed above (e.g., transmission link 138 and/or transmission link 156). In step 200, a computing device (e.g., mobile computing device 12) will be used to take a photograph of an identifier. For example, mobile computing device 12 will be used to take a photograph of a QR code, bar code or other type of code. In step 202, the mobile computing device will determine the identifier encoded in the QR code. In step 204, the mobile computing device will decode parameters from the identifier. For example, the QR code may encode a number. That number may include the indication of an SSID, WEP password (or other authentication password), and/or MAC address. Note that FIG. 6 also shows an alternative embodiment (step 200A), where the user manually enters the identifier into the mobile computing device.

After decoding the parameters, the mobile computing device (e.g., snap engine or other processor) will automatically configure the transmission link based on the parameters from the identifier (step 207). For example, in step 206, the mobile computing device will connect to the wireless network being broadcast by the WiFi transceiver of the memory card or camera (or other storage device). In step 208, the mobile computing device will provide a password to authorize communication on that WiFi network (assuming encryption or other security). In step 210, operational parameters can be configured. For example, the WiFi transceiver on the memory card or digital camera can be configured to indicate how long the transceiver should stay on after taking a photograph, how many photographs should be transmitted at the same time, whether to send videos or not, whether to send RAW and/or JPG photographs, renaming the SSID, whether photographs that have been transmitted should be automatically erased, whether transmission should be manual, whether transmission should start automatically if the card is X % full. Other parameters can also be configured. In one embodiment, the mobile computing device can show a user interface to the user and allow the user to manually change any of the parameters in step 210.

In step 212, the digital camera (e.g., camera 130 or camera 150) will be used to take a photograph. In step 214, that photograph is automatically transferred to the mobile computing device via the wireless link (the wireless network) that was configured in step 207. In step 216, the photograph that was transmitted will be stored on the mobile computing device. In step 218, the photograph will be managed (as discussed below). As mentioned, photographs can be transmitted automatically immediately after being captured, after a card is X % full, after a camera is idle, after Q number of photographs are captured, etc.

In one embodiment, snap engine 104 is used to manage photographs (step 218). FIG. 7 shows three sets of functions that can be performed using snap engine 104. For example, photographs can be accessed on the mobile computing device, on server 10, from any storage on the cloud, or from the camera on the mobile computing device. All these represent sources of photographs for the photograph management system implemented by snap engine 104 and server 10.

The photograph management system includes the notion of feeds and posts. In one embodiment, a feed is a repository of photographs stored on server 10 that can be accessed by various computing devices and can be edited (e.g., re-mixed) by various users using the various computing devices In one embodiment, posts are photographs and remixes of photographs sent by any means described herein to a feed. More details about remixes are described below. Feeds can have actions associated with them. For example, a feed can be set up so that any time a photograph is posted to the feed, a copy of that photograph is automatically sent to a social network page, web site, photo printing service, e-mail service, text message service, photo editing service, etc. FIG. 7 shows that a user can have personal feeds which are feeds set up by the user and owned by the user. A user can view any of the personal feeds, edit the personal feeds, create personal feeds, make new posts to personal feeds and move existing posts into different personal feeds. A post is a submission to a feed of a photograph, comments on the photograph and metadata for that photograph. More details about posts are described below.

In addition to personal feeds, a user can subscribe to feeds owned by others (aka subscribed feeds). With subscribed feeds, the user can view the subscribed feeds, create new posts to the subscribed feeds, and edit existing posts in the subscribed feeds. Some embodiments will require permissions to perform various functions on subscribed feeds.

Figure 8:
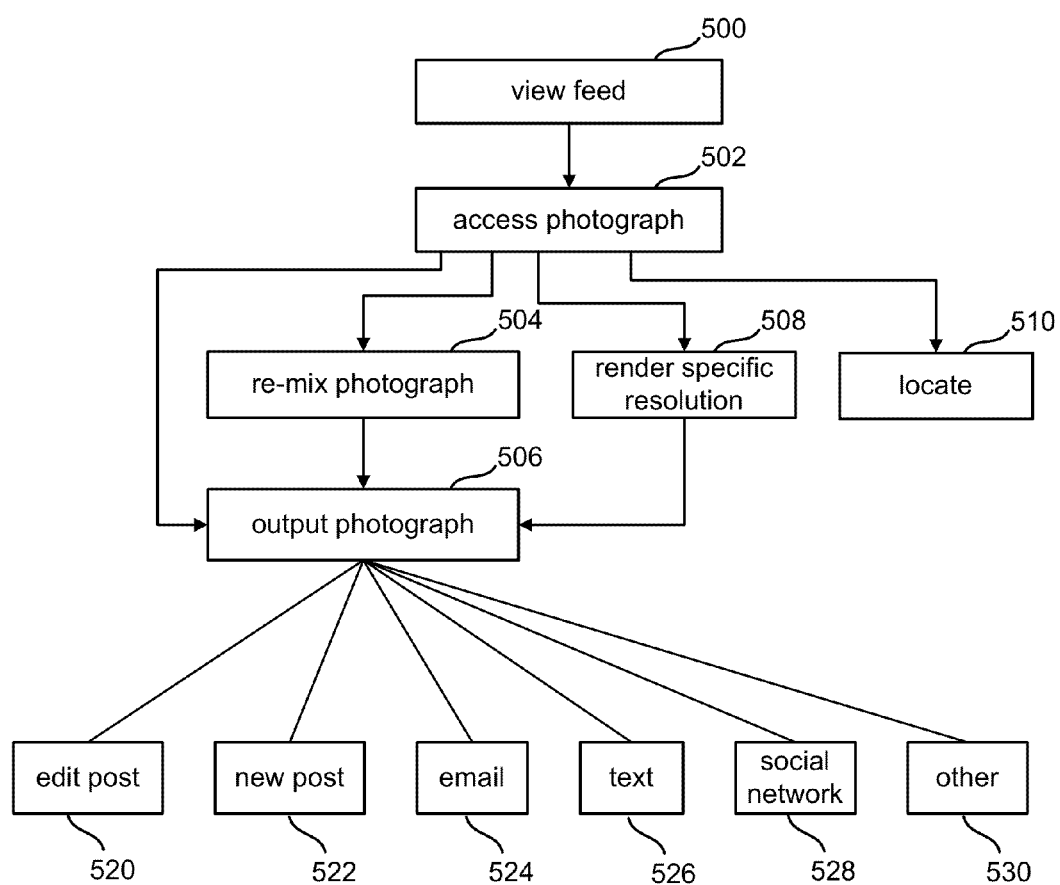
FIG. 8 is a flow chart describing one embodiment of a process for working with a photograph.

FIG. 8 is a flow chart describing one embodiment of a process performed by the snap engine when accessing a feed. Operating a user interface on any of the mobile computing devices described above, a user can choose to access feeds and choose one particular feed to access. That feed will be provided to the user for viewing in step 500. One embodiment of viewing a feed includes downloading a set of thumbnails for each photograph in the feed and displaying those thumbnails to the user. The user can choose any of those thumbnails in step 502 to access the photograph associated with that thumbnail. In one embodiment, step 502 includes displaying a full screen or other larger than a thumbnail version of the photograph. More details of step 502 are provided in FIG. 10.

Once the user has accessed a photograph, the user can choose to remix the photograph in step 504, render specific resolution versions of the photograph in step 508, locate where the photograph is in the photograph hierarchy (see FIG. 12 and discussion below) or output the photograph in step 506. Remixing the photograph is analogous to editing a photograph. The user can crop, resize, rotate, transform (automatically, manually or with preset films), or otherwise edit the photograph.

Outputting the photograph in step 506 includes editing the existing post in step 520. For example, a photograph may be part of an existing post. In step 504, the user can remix the photograph and save the remixed photograph into the existing post; therefore, editing the existing post in step 520. Alternatively, outputting the photograph can include posting the photograph to a feed in a new post (step 522). Additionally, the user can e-mail the photograph (step 524), send the photograph in a text message (step 526), display the photograph on a social networking site (step 528), or otherwise transmit the photograph to another system in step 530 using any other means known in the art.

The photograph management system discussed herein is somewhat collaborative in that users can post photographs to feeds and other users can access the photographs in those feeds, remix the photographs and post the remixes. Other users can then remix the remixes and so on. This way various people can edit other people's photographs and a whole community can see how these photographs have been edited. This allows the sharing of artistic ideas and improving of various photographs for all to benefit. Users (with proper permissions, if permissions are set up) are free to access the photograph at any of the steps of remixing such that a user can access the original photograph before anyone remixed or the photograph at any step between various users who have remixed.

FIG. 9 is a sample process for collaboratively re-mixing of photographs. Other variants of the process of FIG. 9 can also be included within the technology described herein. In step 600, a photograph is accessed. For example, the photograph can come from a camera, sensor, memory, etc. That photograph is then posted to a feed in step 602. In step 604, any user with permission to access the feed can then access the post which includes the photograph. In step 606, the other user who accessed the post/photograph from the feed can remix the photograph and then add comments in step 608. In step 610, the remixed photograph is posted either to a new post or by editing an existing post. The post can be to the same feed and/or a different feed. The process of FIG. 9 will then loop back to step 604 and any other user (or the same user) who has permission to access the feed can then access the remixed or original photograph and repeat the process. The photograph can be remixed many times by the same user or different users. Each time a user uploads a new remix of the photograph in a new post, the photograph management system will allow for old/other versions of the photographs to remain accessible. As will be explained below, all remixing of each photograph is performed using a proxy of the original image, which is stored safely on server 10. Therefore, the original image will not be destroyed or lost. Remixing and commenting can be done independently of each other. Making a comment does not require a remix—it just annotates the original image.

FIG. 10 is a flowchart describing one embodiment of a process performed by the snap engine for accessing a photograph that was posted (see step 600 of FIG. 9 and step 502 of FIG. 8). In step 650, a proxy photograph is downloaded. In one embodiment, the proxy photograph is a 600×600 pixels resolution version of the photograph in the post that the user accessed. In some embodiments, the mobile computing device requesting the proxy photograph will indicate its display resolution and the proxy photograph can then be tailored to the resolution of the display for the mobile computing device (or other computing device). In step 652, metadata for the photograph in the post is downloaded. In one embodiment, when a photograph is remixed, the original photograph is not changed. Rather, the system will store metadata that indicates what all the changes (remixes) are. The metadata could include instructions on how to crop, how to rotate, how to transform, how to edit pixels, etc. In step 654 of FIG. 10, the snap engine for the mobile computing device that downloaded the proxy photograph and the metadata will apply all the metadata for all the remixing in order (but appearing to be at once) to the proxy and photograph. For example, if a photograph has been edited by four different people, all four sets of edits will be made in step 654. In step 656, the photograph (after all remixes) is displayed by the mobile computing device.

FIG. 11 is a flowchart describing one embodiment of a process performed by the snap engine for posting a photograph (see step 610 of FIG. 9). In step 670, the user will choose a feed from the user's feeds and those feeds that the user subscribed to and has permission to post to. In step 672, the user's computing device will transmit a device ID and/or a user ID to server 10. In step 674, the user's mobile computing device will transmit an identification of the photograph to the server 10. In some embodiments, the mobile computing device can also transmit a post ID for a photograph that already exists in a post. In step 676, metadata for any remixing the user performed (see step 606 of FIG. 9) is transmitted from the user's computing device to the server 10. If this is not a new photograph (678), meaning that the photograph already exists in the feed, then the process is complete because the feed has all the information it needs for the new post. If this is a new photograph for this feed, then in step 680, a proxy photograph will be immediately transmitted to the server 10. In one embodiment, the proxy photograph is a 600×600 pixels resolution version of the original photograph. In step 682, the full resolution version (i.e. the original) of the photograph will be transmitted at a later time when bandwidth permits and/or the CPU is available.

Figure 12:
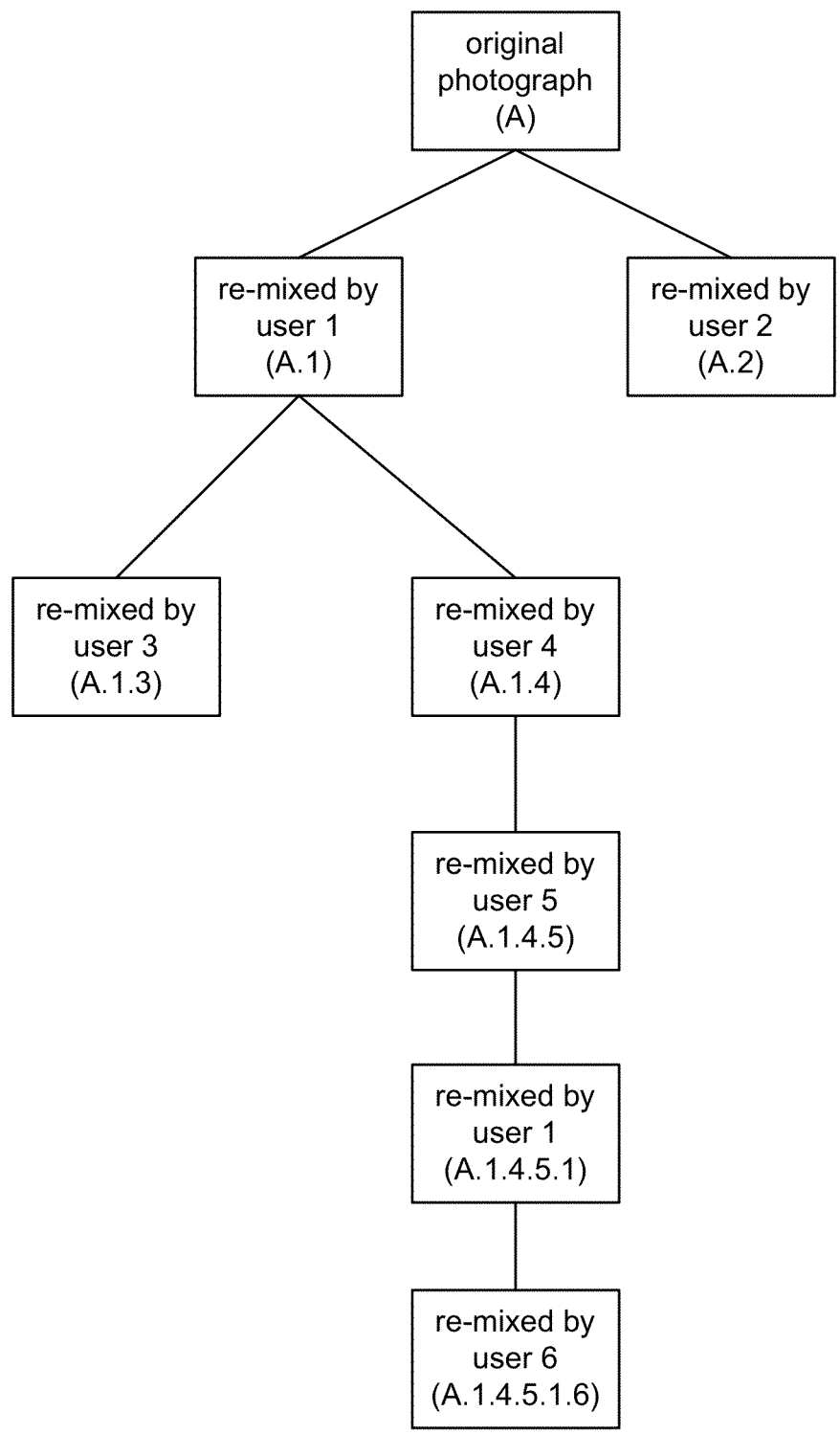
FIG. 12 shows relationships between posts.

As discussed above, feeds can be viewable by multiple people. A user can log into a feed, view all the photographs (posts of themselves and others), choose a photograph (choose another's post or their own post), and remix that post. Therefore, photographs can be remixed by multiple people serially or in parallel. FIG. 12 shows an example tree of how a photograph can be remixed. For example, in the original photograph it is posted to a feed. FIG. 12 represents original photograph as photograph A. User 1 then accesses the feed as described above, remixes photograph A as described above to create photograph A.1. Photograph A.1 is then posted (in a new post) to the same feed. In parallel, user 2 will access the same original photograph A from the same post and remix that photo in a different way to create new remixed photo A.2. User 2 will post photo A.2 to the same feed.

After user 1 posts photograph A.1, user 3 and user 4 will both download photograph A.1, and both user 3 and user 4 will remix photograph A.1. User 3 will create photograph A.1.3, while user 4 will create photograph A.1.4. User 3 will post photograph A.1.3 to the same feed. User 4 will post photograph A.1.4 to the same feed. User 5 will then download and remix photograph A.1.4 to create photograph A.1.4.5. User 5 will post photograph A.1.4.5 to the same feed. User 1 (who created photograph A.1) will then access the post from user 5 to download photograph A.1.4.5. User 1 will remix photograph A.1.4.5 to create photograph A.1.4.5.1, and will then post that remixed photograph to the same feed. Subsequently, user 6 will access the post to obtain photograph A.1.4.5.1 and remix it. User 6 will then post the remixed photograph as photograph A.1.4.5.1.6.

When a user accesses the photograph management system (e.g., snap engine 104 or server 10), the user can choose to view a feed (see FIG. 7). When a feed is transmitted to the user's computing device, all the posts will be transmitted. Therefore, a user who accesses the feed that includes the photographs of FIG. 12 will see all the posts listed in FIG. 12. Therefore, a user with access to that feed can access any of the photographs A, A.1, A.2, A.1.3, A.1.4, A.1.4.5, A.1.4.5.1, or A.1.4.5.1.6, and can then remix any of those photographs. Therefore, even though another user may edit a first person's photograph, the first person's photograph still remains unchanged and a new remix will be provided to the community. As discussed above, each time a user remixes, the user will be remixing by manipulating a proxy photograph. The resulting photograph will not be provided back to the server 10, but instead will be represented by a post that includes the metadata for the remixing. In one embodiment, all the photographs and posts will be stored on server 10, and available to any of the computing devices with the appropriate snap engine 104.

Figure 13:
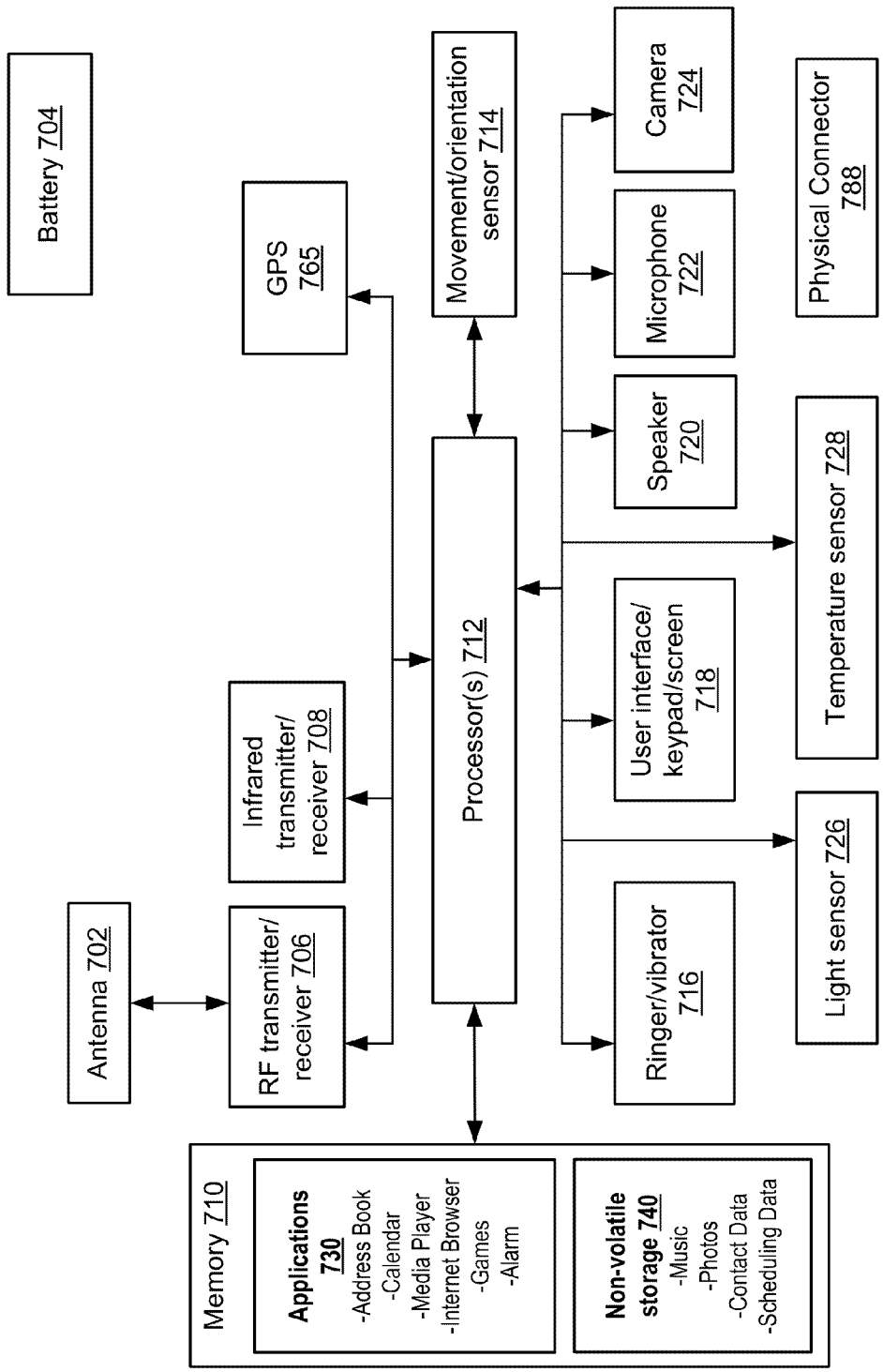
FIG. 13 is a block diagram of a mobile telephone computing device.

FIG. 13 is a block diagram of one embodiment of a mobile device 12. Mobile devices may include laptop computers, pocket computers, mobile telephones, personal digital assistants, tablet computers, and handheld media devices that have been integrated with wireless receiver/transmitter technology.

Mobile device 700 includes one or more processors 712 and memory 710. Memory 710 includes applications 730 and non-volatile storage 740. Memory 710 can be any variety of memory storage media types, including non-volatile and volatile memory. A mobile device operating system handles the different operations of the mobile device 700 and may contain user interfaces for operations, such as placing and receiving phone calls, text messaging, checking voicemail, and the like. The applications 730 can be any assortment of programs, such as a camera application for photographs and/or videos, an address book, a calendar application, a media player, an internet browser, games, an alarm application, and other applications. The non-volatile storage component 740 in memory 710 may contain data such as music, photos, contact data, scheduling data, and other files.

The one or more processors 712 also communicates with RF transmitter/receiver 706 which in turn is coupled to an antenna 702, with infrared transmitter/receiver 708, with global positioning service (GPS) receiver 765, and with movement/orientation sensor 714 which may include an accelerometer and/or magnetometer. RF transmitter/receiver 708 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 712 further communicate with a ringer/vibrator 716, a user interface keypad/screen 718, a speaker 720, a microphone 722, a camera 724, a light sensor 726, and a temperature sensor 728. The user interface keypad/screen may include a touch-sensitive screen display.

The one or more processors 712 controls transmission and reception of wireless signals. In transmission mode, the one or more processors 712 provide voice signals from microphone 722, or other data signals, to the RF transmitter/receiver 706. The transmitter/receiver 706 transmits the signals through the antenna 702. The ringer/vibrator 716 is used to signal an incoming call, text message, calendar reminder, alarm clock reminder, or other notification to the user. In receiving mode, the RF transmitter/receiver 706 receives a voice signal or data signal from a remote station through the antenna 702. A received voice signal is provided to the speaker 720 while other received data signals are processed appropriately.

Additionally, a physical connector 788 may be used to connect the mobile device 700 to an external power source, such as an AC adapter or powered docking station, in order to recharge battery 704. The physical connector 788 may also be used as a data connection to an external computing device. The data connection allows for operations such as synchronizing mobile device data with the computing data on another device.

FIG. 14 illustrates a high level block diagram of a computer system which can be used for various components described above, including the server and other computers (e.g., 14, 16 and 18). The computer system of FIG. 14 includes one or more processors 800 and main memory 802. Main memory 802 stores, in part, instructions and data for execution by processor unit 800 to implement the processes described above. In one embodiment, the snap engine is implemented by software programming the processor. If the system of the present invention is wholly or partially implemented in software, main memory 802 can store the executable code when in operation. The system of FIG. 14 further includes a mass storage device 804, peripheral device(s) 806, user input device(s) 810, output devices 808, portable storage medium drive(s) 812, a graphics subsystem 814 and an output display 816. For purposes of simplicity, the components shown in FIG. 14 are depicted as being connected via a single bus 818. However, the components may be connected through one or more data transport means. For example, processor unit 800 and main memory 802 may be connected via a local microprocessor bus, and the mass storage device 804, peripheral device(s) 806, portable storage medium drive(s) 812, and graphics subsystem 64 may be connected via one or more input/output (I/O) buses. Mass storage device 804, which may be implemented with a magnetic disk drive, an optical disk drive or a solid-state disk drive, is a non-volatile storage device for storing data and instructions for use by processor unit 800. In one embodiment, mass storage device 804 stores the system software for implementing the present invention for purposes of loading to main memory 802.

Portable storage medium drive 812 operates in conjunction with a portable non-volatile storage medium, such as a floppy disk, to input and output data and code to and from the computer system of FIG. 14. In one embodiment, the system software for implementing the present invention is stored on such a portable medium, and is input to the computer system via the portable storage medium drive 812. Peripheral device(s) 806 may include any type of computer support device, such as an input/output (I/O) interface, to add additional functionality to the computer system. For example, peripheral device(s) 806 may include a network interface for connecting the computer system to a network, a modem, a router, etc.

User input device(s) 810 provides a portion of a user interface. User input device(s) 810 may include an alpha-numeric keypad for inputting alpha-numeric and other information, or a pointing device, such as a mouse, a trackball, stylus, or cursor direction keys. In order to display textual and graphical information, the computer system of FIG. 14 includes graphics subsystem 814 and output display 816. Output display 816 may include a cathode ray tube (CRT) display, liquid crystal display (LCD) or other suitable display device. Graphics subsystem 814 receives textual and graphical information, and processes the information for output to display 816. Additionally, the system of FIG. 14 includes output devices 808. Examples of suitable output devices include speakers, printers, network interfaces, monitors, etc.

The components contained in the computer system of FIG. 14 are those typically found in computer systems suitable for use with the present invention, and are intended to represent a broad category of such computer components that are well known in the art. Thus, the computer system of FIG. 14 can be a personal computer, mobile computing device, workstation, server, minicomputer, mainframe computer, or any other computing device. The computer can also include different bus configurations, networked platforms, multi-processor platforms, etc. Various operating systems can be used including Unix, Linux, Windows, Windows Mobile, Windows Phone, Macintosh OS, iOS, Palm OS, Blackberry, and other suitable operating systems.

One embodiment include receiving an identifier at a computing device; automatically configuring a wireless link between the mobile computing device and a content storage device based on the identifier; and transmitting content between the mobile computing device and the content storage device via the configured wireless link.

One embodiment includes a transceiver and a processor in communication with the transceiver. The processor receives an identifier and automatically configures a wireless link between the transceiver and a content storage device based on the identifier. Content is transmitted between the transceiver and the content storage device via the configured wireless link.

One embodiment includes taking a photograph of an identifier using a mobile computing device; automatically determining the identifier from the image; automatically configuring a wireless link between the mobile computing device and a photograph storage device based on the determined identifier; and transmitting photographs between the mobile computing device and the photograph storage device via the configured wireless link.

One embodiment includes taking a photograph; adding the photograph to a feed; requesting access to a first image in the feed; receiving a proxy for the image; building the first image from the proxy; editing the first image; adding the edited first to the feed with changing the first image in the feed; and allowing for other users to access and create new images of the first image and edited first image in the feed without the other users changing the first image and edited first image in the feed.

One embodiment includes taking a photograph; posting the photograph to a feed; and re-mixing the photograph and posting the re-mix to the same or different feed.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated.

What is claimed is:
1. A method for providing a transmission link, comprising:
receiving an identifier at a mobile computing device;
automatically configuring a wireless link between the mobile computing device and a content storage device based on the identifier comprising configuring operation of the content storage device; and transmitting content between the mobile computing device and the content storage device via the configured wireless link.

2. The method of claim 1, wherein the receiving an identifier comprises:
sensing an image of an identifier by the mobile computing device; and
determining the identifier from the image, the wireless link is configured based on the determined identifier.

3. The method of claim 1, further comprising:
decoding one or more parameters from the identifier, the wireless link is configured based on the decoded parameters.

4. The method of claim 3, wherein:
the one or more parameters includes a SSID.

5. The method of claim 3, wherein:
the one or more parameters includes a password.

6. The method of claim 3, wherein:
the one or more parameters includes a MAC address.

7. The method of claim 1, wherein the automatically configuring the wireless link comprises:
connecting to a wireless network broadcast by the content storage device.

8. The method of claim 7, wherein the automatically configuring the wireless link comprises:
providing a password to authorize communication.

9. The method of claim 1, wherein:
the content is a photograph; and
the automatically configuring the wireless link between the mobile computing device and a content storage device based on the identifier comprising configuring operation of the content storage device further comprises: configuring whether the content storage device transmits a photo as RAW or JPG and configuring whether the content storage device should erase content after being transmitted.

10. The method of claim 1, wherein:
the identifier is a QR code.

11. The method of claim 1, wherein:
the identifier is a bar code.

12. The method of claim 1, wherein:
the identifier is an RFID.

13. The method of claim 1, wherein:
the content storage device is a camera.

14. The method of claim 1, wherein:
the content storage device is a memory card adapted to be installed in a camera.

15. The method of claim 1, wherein the content is a photograph, the method further comprising:
adding the photograph to a feed;
requesting access to a first image in the feed;
receiving a proxy for the image;
building the first image from the proxy;
editing the first image;
adding the edited first to the feed with changing the first image in the feed; and
allowing for other users to access and create new images of the first image and edited first image in the feed without the other users changing the first image and edited first image in the feed.

16. The method of claim 15, wherein:
the receiving a proxy for the image further includes receiving metadata; and
the building the first image includes using the metadata to create the first images from the proxy.

17. A computing system, comprising:
a transceiver;
a processor in communication with the transceiver, the processor receives an identifier and automatically configures a wireless link between the transceiver and a content storage device based on the identifier comprising configuring operation of the content storage device; and
the transceiver receives content from the content storage device via the configured wireless link.

18. The computing system of claim 17, further comprising:
a sensor in communication with the processor, the sensor senses an image of the identifier, the processor determines the identifier from the image, the wireless link is configured based on the determined identifier.

19. The computing system of claim 17, wherein:
the processor decodes one or more parameters from the identifier, the wireless link is configured based on the decoded parameters.

20. The computing system of claim 17, wherein:
the content storage device is at least one of a camera or a memory card adapted to be installed in a camera.

21. The computing system of claim 17, wherein:
the processor automatically configures the wireless link by having the transceiver connect to a wireless network broadcast by the content storage device and provide a password to authorize communication.

22. One or more processor readable storage devices comprising instructions which cause one or more processors to execute a method for providing a transmission link, the method comprising:
receiving an identifier at a mobile computing device;
automatically configuring a wireless link between the mobile computing device and a content storage device based on the identifier comprising configuring operation of the content storage device; and
transmitting content between the mobile computing device and the content storage device via the configured wireless link.

23. The one or more processor readable storage devices of claim 22 wherein the method further comprises:
the identifier is on a surface of the content storage device; and
wherein the receiving an identifier further comprises sensing an image of the identifier on the surface of the content storage device by the mobile computing device; and
determining the identifier from the image.

24. The one or more processor readable storage devices of claim 23 wherein the method further comprises:
the content storage device is at least one of a camera or a memory card adapted to be installed in a camera.

* * * * *